June 16, 1959  A. L. SEMON  2,890,713
FLUID PRESSURE REGULATORS
Filed April 23, 1956
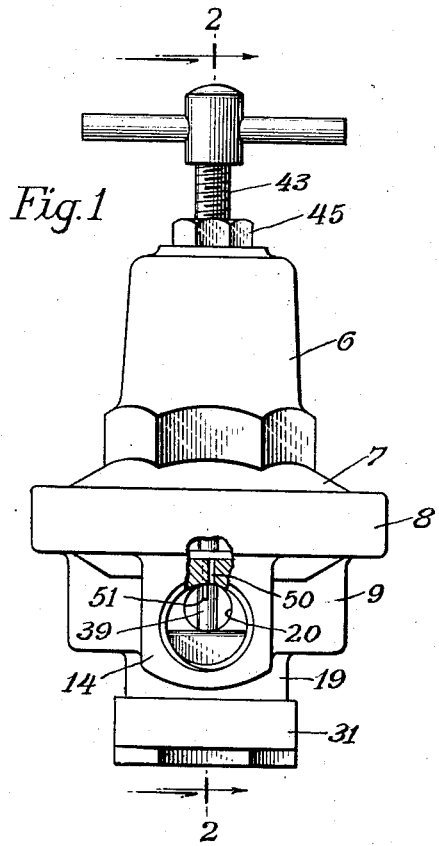
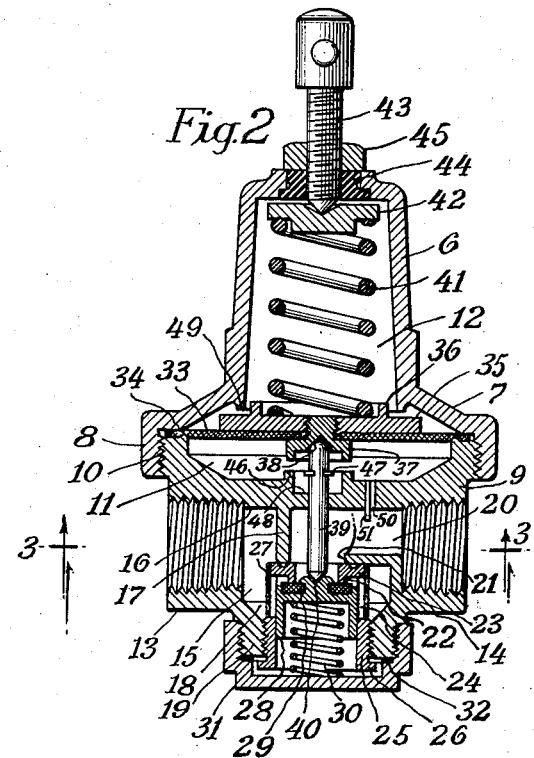
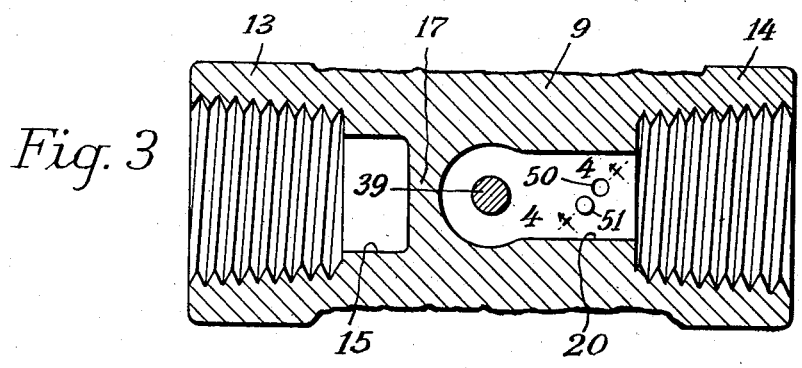
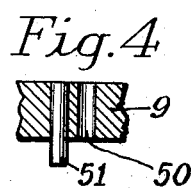
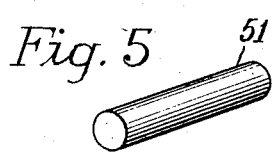
INVENTOR
A.L.Semon
BY John A. Seifert
ATTORNEY

2,890,713

FLUID PRESSURE REGULATORS

Albert L. Semon, Short Hills, N.J.

Application April 23, 1956, Serial No. 579,869

4 Claims. (Cl. 137—484.8)

This invention relates to fluid pressure regulators wherein the flow of fluid through the regulators is controlled by a diaphragm adjusted to a desired pressure.

In this type of fluid pressure regulator, it has been found that the pressure at the inlet and outlet of the regulator vary to a great degree.

It is the object of the invention to reduce this variation in pressures at the inlet and outlet of the regulator whereby the drop in pressure at the outlet is held at a minimum without increasing the size of the regulator, or without using pilot valves.

Other objects and advantages of the invention will be hereinafter described.

In the drawing accompanying and forming a part of this application:

Figure 1 is an elevational view of a regulator looking at the outlet side thereof and partly broken-away to show the embodiment of the invention;

Figure 2 is a sectional view taken on the line 2—2 of Figure 1 looking in the direction of the arrows;

Figure 3 is a cross-sectional view, on an enlarged scale, taken on the line 3—3 of Figure 2 looking in the direction of the arrows with the upper portion of the regulator broken-away;

Figure 4 is a fragmentary cross-sectional view taken on the line 4—4 of Figure 3 looking in the direction of the arrows to show the relationship of parts; and Figure 5 is a perspective view, on an enlarged scale, of a projection forming part of the invention.

The present invention is embodied in a fluid pressure regulator comprising an upper casing member having a cylindrical portion 6 and an annular enlargement 7 at the bottom of the cylindrical portion 6 and arranged with a vertical skirt portion 8. A lower casing member 9 is removably connected to the skirt portion 8 by screw-threads 10, as shown in Figure 2. The upper end of the lower casing member 9 is recessed, as at 11 in Figure 2, to form a diaphragm chamber 12 with the upper casing member portions 6 and 7. Below the recess 11, the lower casing member 9 is provided with horizontally-aligned bosses 13 and 14 internally screw-threaded for connecting the regulator in a pipe-line, not shown. The boss 13 is connected in communication with a source of fluid under pressure, such as an air-compressor, not shown, and therefore said boss 13 will constitute the inlet of the regulator. The boss 14 is connected in communication with a fluid-pressure operated tool or device, not shown, and therefore said boss 14 will constitute the outlet of the regulator.

The boss 13 communicates with a chamber 15 formed by a portion 16 of the bottom wall of the recess 11, a vertical wall 17 depending from said bottom wall on one side of the vertical center of the casing, and a bevelled shoulder 18 of a circular boss 19 depending from the bottom of the casing member 9 between the bosses 13 and 14.

The boss 14 communicates with a tubular passage 20 terminating on the side of the vertical center of the casing opposite the side on which the vertical wall 17 is positioned. The bottom portion of the terminating end of the passage 20 and the wall 17 are spaced equal distances from the vertical center of the casing, and the bottoms of the wall 17 and the passage 20 extend in the same horizontal plane to form an opening 21, as shown in Figure 2. Said opening 21 is provided with an annular valve seat 22 depending from an annular member 23 abutting the bottoms of the wall 17 and the passage 21 and integral with equidistantly spaced ribs 24 integral with an annular head 25 screw-threaded in the boss 19 and having a flange 26 abutting the end of the boss 19, as shown in Figure 2. The fluid entering the inlet boss 13 will flow from the chamber 15 through the spaces between the ribs 24 around the valve seat 22 through the opening in the annular member 23 through the passage 20 to the outlet boss 14. To prevent the passage of foreign matter through the spaces between the ribs 24, the opening in the annular member 23 and the passage 20, an annular screen 27 is mounted between the annular member 23 and the head 25 to encircle the ribs 24 and span the spaces between said ribs. The chamber 15 due to the bottom wall of the passage 20 will encircle the valve seat member 22–26, as shown in Figure 2.

The flow of fluid through the opening in the annular member 23 is controlled by a valve comprising an inverted cup-shaped body 28 slidable in the tubular space formed by the ribs 24 and the head 25. The exterior of the closed end of the body 28 is provided with an annular face of resilient material, as shown at 29 in Figure 2, to engage the valve seat 22. The resilient material 29 is yieldingly urged against the seat 22 by a spring 30 compressed between the inner face of the closed end of the valve body 28 and a closure cap 31 screw-threaded on the exterior of the boss 19. To provide a seal between the closure cap 31 and the boss 19, the closure cap 31 is provided with an internal shoulder and a sealing gasket between the shoulder and the end of the boss, as shown at 32 in Figure 2.

The valve 28, 29 is actuated to open position by a diaphragm 33 clamped at its peripheral edge portion between the upper and lower casing members. The peripheral edge portion of the diaphragm is held against lateral displacement by an annular lip 34 on the lower casing member impinging the diaphragm, as shown in Figure 2. The center of the diaphragm is reinforced by a plate 35 mounted on the upper face of the diaphragm and having an annular flange 36 on its upper face. The plate 35 is secured to the diaphragm 33 by a bolt 37 extended through the diaphragm and screw-threaded in the plate 35. The exterior of the head of the bolt 37 is recessed with a conical depression in the center, as shown at 38 in Figure 2. The diaphragm 33 is operatively connected to the valve 28, 29 by a stem 39 slidable in the bottom wall of the recess 11 and having the upper end rounded to engage in the conical depression 38 and the lower end of the stem is pointed to engage a depression in the center of the exterior of the closed end of the valve member 28, as shown at 40 in Figure 2.

The diaphragm 33 is yieldingly adjusted to open the valve 28, 29 and permit a flow of fluid through the outlet boss 14 at a predetermined pressure. This is accomplished by a spring 41 having the lower end portion seated within the annular flange 36 and the upper end portion arranged with a plate 42 having a conical depression for the engagement of a conical end of an adjusting-screw 43 screw-threaded in a bushing 44 of resilient material wedged into an opening in the upper end portion of the casing member portion 6, as shown in Figure 2. The adjusting-screw 43 is retained in adjusted position by a lock-nut 45.

Movement of the diaphragm 33 into the recess 11 is limited by a peripheral edge of the head of the bolt 37 abutting an annular boss 46 on the bottom wall of the recess 11. A split-resilient ring 47 is secured on the stem 39 to abut the bottom of a depression 48 in the center of the boss 46 and prevent the stem 39 from dropping with the removal of the valve 28, 29. The movement of the diaphragm 33 toward the casing member portion 6 is limited by an annular shoulder 49 depending from the portion 6, as shown in Figure 2.

Should the pressure of the fluid at the outlet boss 14 exceed the desired pressure for which the diaphragm 33 is adjusted, the diaphragm is moved or flexed in an upward direction by the excessive pressure against the adjusted force of the spring 41 to permit the valve 28, 29 to abut the valve seat 22 and close the opening 21 under the force of the spring 30. This is accomplished by an opening 50 in the bottom wall of the recess 11 to form a venturi communication between said recess and an intermediate portion of the passage 20, as shown in Figure 2.

It has been found that in a regulator constructed as hereinbefore described, fluid entering the inlet boss 13 at a pressure of two hundred pounds per square inch and the diaphragm 33 is adjusted to open the valve 28, 29 to pass the fluid through the opening 21 at a pressure of one hundred pounds per square inch. Under these conditions when the fluid is discharged into a fluid-pressure operated tool or device at a rate of three hundred thirty-seven cubic feet per minute, the pressure of the fluid at the outlet boss 14 will drop to eighty-eight pounds per square inch with the pressure of the fluid under the diaphragm 33 or in the recess 11 at eighty-two pounds per square inch and the pressure of the fluid on the outlet side of the opening 21 being at one hundred three pounds per square inch.

It is the object of the invention to reduce this drop in pressure at the outlet boss 14 under the same working conditions by providing an obstruction on one side of the direct flow of fluid from the opening 21 to the opening 50. This is accomplished by positioning the opening 50 on one side of the horizontal centers of the bosses 13 and 14 and securing a projection in the form of a pin 51 in the bottom wall of the recess 11 on the opposite side of said horizontal centers with the pin projecting into the passage 20. The diameters of the opening 50 and the pin 51 are substantially the same and the centers of the opening 50 and the pin 51 are in alignment with each other on a line extending approximately forty-five degrees to the horizontal centers of the bosses 13 and 14, as shown in Figure 3. If the center of the pin 51 was moved in a vertical direction across the horizontal centers of the bosses 13 and 14 to lie in horizontal alignment with the center of the opening 50, the circumferences of the opening and the pin will merge or touch each other as they appear to do in Figure 2. If the center of the pin 51 was moved in a horizontal direction to lie in vertical alignment with the center of the opening 50, the circumferences of the opening and the pin will also merge or touch each other, as they appear to do in Figure 1. The movements of the pin 51 apply to Figure 3.

It has been found that by providing the arrangement of the opening 50 and the pin 51 as described, the drop in the pressure of the fluid at the outlet boss 14 is held at a minimum. For example, if the fluid enters the inlet boss 13 at a pressure of two hundred pounds per square inch and the diaphragm 33 is adjusted to open the valve 28, 29 to pass the fluid through the opening 21 at one hundred pounds per square inch and the fluid is discharged into a fluid-pressure operated tool or device at a rate of three hundred ninety-four cubic feet per minute, the pressure of the fluid at the outlet boss 14 will only drop to ninety-five pounds per square inch with the pressure of the fluid under the diaphragm 33 or in the recess 11 at sixty pounds per square inch and the pressure of the fluid on the outlet side of the opening 21 being at one hundred thirty pounds per square inch.

In the examples given, the size of the regulator is the same and is connected to a fluid-pressure operated tool of the same fluid pressure capacity. In the regulator without the opening 50 and the pin 51 on opposite sides of the horizontal centers of the bosses 13 and 14, the regulator cannot deliver the maximum fluid pressure required by the fluid-pressure operated tool. The location of the opening 50 and the pin 51 on opposite sides of the horizontal centers of the bosses 13 and 14 increases the velocity of flow past the opening 50 and thereby increases the suction in the recess 11.

Having thus described my invention, I claim:

1. In a fluid pressure regulator, a casing arranged with an inlet and an outlet, a valve interposed in the casing between the inlet and the outlet for controlling the flow of fluid from the inlet to the outlet and yieldingly urged to closing position, a diaphragm chamber in the casing having an opening in a wall thereof in communication with the flow of fluid in a low pressure zone between the valve and the outlet, a diaphragm in the diaphragm chamber and operatively connected to the valve and yieldingly adjustable to open the valve, the improvement comprising an obstruction of substantially the same size and shape as the opening extending into the flow of fluid between the valve and the opening in the diaphragm chamber wall in such a manner that the obstruction and the opening in the diaphragm wall are spaced apart and on opposite sides of the horizontal center of the outlet, the shape of the obstruction and its relationship to the opening being such that the velocity of flow past the opening creates in the opening a pressure lower than that which exists in the outlet remote from the obstruction.

2. A fluid pressure regulator as claimed in claim 1, wherein the obstruction is a pin.

3. A fluid pressure regulator as claimed in claim 2, wherein the opening in the diaphragm chamber wall and the pin are round and substantially of the same diameter.

4. A fluid pressure regulator as claimed in claim 3, wherein the inlet and outlet are in horizontal alignment with each other, and the centers of the opening in the diaphragm chamber wall and the pin are in alignment with each other on a line extending approximately at a forty-five degree angle to the horizontal centers of the inlet and outlet of the casing.

References Cited in the file of this patent

UNITED STATES PATENTS

| | | |
|---|---|---|
| 1,945,834 | Terry | Feb. 6, 1934 |
| 2,305,975 | McKinley | Dec. 22, 1942 |
| 2,587,375 | Paulsen | Feb. 26, 1952 |
| 2,661,578 | Niesemann | Dec. 8, 1953 |